United States Patent Office 2,959,617
Patented Nov. 8, 1960

2,959,617
SYNTHESIS OF VINYL AMINES

Blaine Chase McKusick and John Carl Sauer, Wilmington, Del., assignors to E. I. du Pont de Nemours and Company, Wilmington, Del., a corporation of Delaware No Drawing. Filed Mar. 4, 1957, Ser. No. 643,552

16 Claims. (Cl. 260—570.5)

This invention relates to the synthesis of ethylenically-unsaturated amines having a sulfone group.

In our application Serial Number 643,490, filed of even date herewith, there are claimed novel and useful ethylenically-unsaturated amines possessing a sulfone group. The novel compounds of the copending application can be referred to as 1-hydrocarboamino-2-hydrocarbosulfonylethylenes or as N-hydrocarbo-2-hydrocarbosulfonylvinylamines. The object of the present invention is to provide a new synthesis of these novel amines.

The synthesis of this invention is an unusual catalyzed molecular rearrangement of certain sulfonamides which may be represented by the equation:

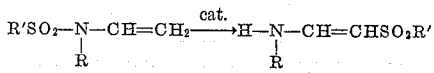

wherein R and R' are hydrocarbon radicals of generally not more than 12 carbons each, i.e., possess 1–12 carbon atoms, and are preferably alkyl or aryl. The catalysts employed are azo compounds which produce free radicals on decomposition. The reaction is generally carried out with the reactants in a liquid state and at a temperature sufficiently high to produce substantial amounts of the free radicals.

As noted in the above-mentioned copending application and in the equation given, our new compounds have the formula:

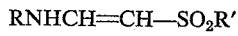

wherein R and R' are hydrocarbon radicals free from open chain unsaturation and have not more than 12 carbons each. The preferred compounds have alkyl or aryl hydrocarbon groups of generally not more than 7 carbons. Examples of the hydrocarbon radicals that are embraced include methyl, ethyl, butyl, hexyl, cyclohexyl, phenyl, tolyl, naphthyl, and diphenyl for R and R'. Examples of such compounds include N-phenyl-2-phenylsulfonylvinylamine, N - n - butyl - 2 - n - butylsulfonylvinylamine, N-cyclohexyl - 2 - o - tolylsulfonylvinylamine, N - ethyl - 2 - p - tert. - butylphenylsulfonylvinylamine, N - n - hexyl - 2 - phenyl - sulfonylvinylamine, N - methyl - 2 - phenylsulfonylvinylamine, N - methyl - 2 - p - tolylsulfonylvinylamine, N - n - butyl - 2 - p - tolylsulfonylvinylamine, N - methyl - 2 - n - butylsulfonylvinylamine, N - methyl - 2 - methylsulfonylvinylamine, N - methyl - 2 - β - naphthylsulfonylvinylamine, and others.

These aminosulfonylethylenes or vinylamines are now obtained by rearrangement of the corresponding N-vinylsulfonamides by the action of free radicals from the decomposition of azo compounds. N-vinylsulfonamides are readily available by the reaction of acetylene with sulfonamides, according to U.S. 2,317,804, 2,324,896, and Cairns and Sauer, J. Org. Chem., 20, 627 (1955). Suitable N-vinylsulfonamides that can be employed in the process of this invention include N-ethyl-N-vinyl-p-t - butylphenylsulfonamide, N - n - butyl - N - vinyl - n-butanesulfonamide, N - cyclohexyl - N - vinyl - o - toluenesulfonamide, and N-n-hexyl-N-vinylbenzenesulfonamide.

The use of the azo compounds as the source of the free radicals is rather specific. Other sources of free radicals are less effective in catalyzing the rearrangement. See, for instance, one of the examples below in which the more readily available peroxy compounds are shown to be relatively ineffective.

The azo compounds that can be employed are those that have the acyclic azo, —N=N—, group bonded from both nitrogens to different carbons which are non-aromatic (aliphatic) in character, at least one of which is tertiary, and one of the carbons bonded to said tertiary carbon atom having its three remaining valences satisfied by at least one element of atomic number 7–8 (oxygen and/or nitrogen). Azo compounds of this type have been recognized as sources of free radicals (see U.S. 2,471,959). Examples of these azo compounds are α-(carbamylazo)isobutyronitrile, 1,1' - azodicyclohexanecarbonitrile, α,α'-azodiisobutyramide, and diethyl α,α'-azodiisobutyrate.

The azo compounds should generally be present in a quantity greater than that usually required to catalyze vinyl polymerizations. At least 1% by weight and usually more than 2.5% by weight, e.g., 3–15%, based on the weight of the sulfonamide is employed.

The rearrangement of this invention is preferably carried out in the liquid phase. An added inert solvent may or may not be used. Suitable solvents are alcohols such as methanol and ethanol ethers such as dioxane, and hydrocarbons such as benzene.

Temperatures at which the azo compound smoothly forms free radicals, e.g., 35–125° C., are employed. The specific temperature will depend upon the specific azo compound and the rate of rearrangement desired. Although decomposition of the azo compounds is generally accomplished by the application of heat within the temperature range noted, light within the range of 3100–4500 Angstrom units can be employed usually with a somewhat lowered temperature, e.g., 35 to —20° C. or lower.

The reaction generally proceeds rather rapidly under conditions of temperature or light wherein the azo compound undergoes smooth decomposition, e.g., within the elevated temperature range or in the presence of light. A few hours generally suffice to produce a satisfactory yield.

The vinylamines obtained by the process of this reaction are isolated by taking advantage of the difference in physical and chemical properties possessed by the new compounds. Fractional crystallization is perhaps the preferred method of separation since the new sulfonylamines are generally much higher melting than the initial vinylsulfonamides. Fractional distillation is sometimes a useful method of separation since the sulfonylamines also generally have higher boiling points than the corresponding vinylsulfonamides.

Preferred embodiments of the invention will be evident from the foregoing discussion. In practice, the desired quantity of azo compound is simply incorporated in the desired sulfonamide, the latter being maintained as a liquid by heat or in solution in an inert solvent, and the resultant mixture exposed to heat or light for a few hours. The product is then recovered as described.

The examples which follow, in which parts are by weight, illustrate specific embodiments of the invention. In the absorption data given, λ is the wave length, ε the molecular extinction coefficient, and k the specific extinction coefficient as defined by Harrison, Lord and Loofbourow, "Practical Spectroscopy," pages 363–365. EtOH represents ethanol.

EXAMPLE 1

*N-methyl-2-phenylsulfonylvinylamine*

A solution of 13 parts of α,α'-azodiisobutyronitrile in 260 parts of N-methyl-N-vinylbenbenesulfonamide was heated at 90° C. for 3 hours. Crystallization of the reaction mixture from ethyl acetate gave 138 parts (53% conversion) of N-methyl-2-phenylsulfonylvinylamine melting at 129–130° C.;

$$\lambda_{max.}^{EtOH} = 263 \, m\mu$$

($\epsilon = 15,100$).

The N-methyl-N-vinylbenzenesulfonamide [M.P. 34–35° C.;

$$\lambda_{max.}^{EtOH} = 242 \, m\mu$$

$\epsilon = 6100$] was prepared by condensing N-methylbenzenesulfonamide with acetylene as described by Cairns and Sauer, loc. cit. The table shows the inferior results when the α,α'-azodiisobutyronitrile was replaced by other initiators (last two items) of radical reactions.

TABLE

| Initiator | Reaction Temp., ° C. | Percent Conversion to N-Methyl-2-phenyl-sulfonyl-vinylamine |
|---|---|---|
| α, α'-Azobis (α, γ, γ-trimethylvaleronitrile) | 50 | 41 |
| α, α'-Azobis(α-methylisocapronitrile) | 70 | 49 |
| Acetyl peroxide (25% solution in dimethyl phthalate) | 70 | 8 |
| 2,2-Bis(t-butylperoxy)-butane | 110 | 3 |

EXAMPLE 2

*N-methyl-2-p-tolylsulfonylvinylamine*

A solution of 50 parts of α,α'-azodiisobutyronitrile in 1000 parts of N-methyl-N-vinyl-p-toluenesulfonamide was heated at 90° C. for 3 hours. Crystallization of the reaction mixture from ethyl acetate gave 584 parts of N-methyl-2-p-tolylsulfonylvinylamine [M.P.=122–123° C.;

$$\lambda_{max.}^{EtOH} = 264 \, m\mu$$

($\epsilon = 16,200$)].

The N-methyl-N-vinyl-p-toluenesulfonamide [M.P. =56–56.5° C.;

$$\lambda_{max.}^{EtOH} = 240 \, m\mu$$

($\epsilon = 8500$)] was prepared from N-methyl-p-toluenesulfonamide and acetylene by the method of Cairns and Sauer, loc. cit.

EXAMPLE 3

*N-n-butyl-2-p-tolylsulfonylvinylamine*

N-n-butyl-N-vinyl-p-toluenesulfonamide [B.P.=126°/0.1 mm.; $n_D^{25}=1.5279$;

$$\lambda_{max.}^{EtOH} = 242 \, m\mu$$

($\epsilon = 7340$)] was prepared from N-butyl-p-toluenesulfonamide and acetylene by the method of Cairns and Sauer, loc. cit. A solution of 50 parts of α,α'-azodiisobutyronitrile in 1000 parts of N-n-butyl-N-vinyl-p-toluenesulfonamide was heated at 90° C. for 3 hours. The yield of N-n-butyl-2-p-tolylsulfonylvinylamine was 65–70%. It had $$\lambda_{max.}^{EtOH} = 267 \, m\mu$$

($k = 45$).

EXAMPLE 4

*N-methyl-2-n-butylsulfonylvinylamine*

N-methyl-N-vinylbutanesulfonamide (B.P.=100° C./2 mm.; $n_D^{25}=1.4691$) was prepared from N-methylbutanesulfonamide and acetylene according to the method of Cairns and Sauer, loc. cit.

A solution of 40 parts of α,α'-azodiisobutyronitrile in 1000 parts of N-methyl-N-vinylbutanesulfonamide was heated at 90° C. for 4 hours. The reaction mixture then contained 324 parts of N-methyl-2-n-butylsulfonylvinylamine $$[\lambda_{max.}^{EtOH} = 243 \, m\mu$$

($k = 6.7$)].

EXAMPLE 5

*N-methyl-2-methylsulfonylvinylamine*

N-methyl-N-vinylmethanesulfonamide (B.P. 39°/0.5 mm.; $n_D^{25}=1.4705$) was prepared from N-methylmethanesulfonamide and acetylene according to the method of Cairns and Sauer, loc. cit. A solution of 50 parts of α,α'-azodiisobutyronitrile in 1000 parts of N-methyl-N-vinylmethane-sulfonamide was heated at 90° C. for 2½ hours. The infrared absorption spectrum of the reaction mixture showed strong absorption at 2.95μ and the ultraviolet spectrum had $$\lambda_{max.}^{EtOH} = 237 \, m\mu$$

($k = 33$), indicating that rearrangement to N-methyl-2-methylsulfonylvinylamine had occurred. Alkaline hydroylsis and quantitative determination of the liberated methylamine showed that the reaction mixture contained 290 parts of N-methyl-2-methylsulfonylvinylamine.

EXAMPLE 6

*N-methyl-2-phenylsulfonylvinylamine*

A solution of 250 parts of N-methyl-N-vinylbenzenesulfonamide and 12.5 parts of α,α'-azodiisobutyronitrile in 1000 parts by volume of methanol was refluxed for 5 hours. Cooling the solution in ice caused the precipitation of 132 parts of N-methyl-2-phenylsulfonylvinylamine. Concentration of the filtrate caused the precipitation of an additional 38 parts of the vinylamine.

EXAMPLE 7

*N-methyl-2-phenylsulfonylvinylamine*

A solution of 5.3 parts of α,α'-azodiisobutyronitrile and 133 parts of N-methyl-N-vinylbenzenesulfonamide was placed in a quartz tube maintained below 20° C. by cooling water. The tube was exposed to light from a sun-lamp for 28 hours. During irradiation the contents of the tube were maintained at a pressure below 1 mm. by means of an oil pump in order to continuously remove volatile inhibitors of the rearrangement that were formed through the influence of the light. Crystalline N-methyl-2-phenylsulfonylvinylamine separated from solution during the course of the irradiation. Infrared analysis of the mixture as a whole showed that 6.7 parts of N-methyl-2-phenylsulfonylvinylamine had been formed.

EXAMPLE 8

*N-methyl-2-β-naphthylsulfonylvinylamine*

N-methyl-N-vinyl-β-naphthalenesulfonamide was prepared by treating the p-toluenesulfonic acid ester of N-methyl-N-(2-hydroxyethyl)-β-naphthalenesulfonamide with alcoholic potassium hydroxide. Ten grams of the ester was refluxed for 2 hours with a solution of 5 grams potassium hydroxide in 50 ml. of 95% ethanol. The reaction mixture was diluted with 50 ml. water and extracted with ether. The ether was removed by vacuum evaporation and the N-methyl-N-vinyl-β-naphthalenesulfonamide distilled through a short path distillation apparatus. The fraction (3.3 grams) boiling at 150–160° C./0.05 mm. was collected.

*Analysis.*—Calcd. for $C_{13}H_{13}SO_2N$: C, 63.2; H, 5.26; N, 5.67. Found: C, 63.36; H, 5.37; N, 5.95.

The structure of the product was further confirmed by its infrared spectrum.

A solution of 20 parts of α,α'-azodiisobutyronitrile in 200 parts of N-methyl-N-vinyl-β-naphthalene-sulfonamide was heated at 90° C. for 2 hours. The reaction mixture was taken up in 800 parts by weight of methanol and cooled to give 30 parts of crystalline N-methyl-2-β-naphthylsulfonylvinylamine (M.P.=134–136°). The identity of the product was confirmed by infrared and ultraviolet absorption spectra. The infrared spectrum showed the presence of strong —NH and sulfonyl-SO$_2$ bands, and the ultraviolet spectrum had $$\lambda_{max.}^{EtOH} = 267 \, m\mu$$

(ε=20,100).

EXAMPLE 9

*N-methyl-β-p-tolylsulfonyl-α-styrylamine*

A solution of 75 parts of α,α'-azodiisobutyronitrile in 1500 parts of N-methyl-N-α-styryl-p-toluenesulfonamide was heated at 90° C. for 2.5 hours. A sample (320 parts) of the product was dissolved in 500 parts of hot ethyl acetate and cooled to give 300 parts (about 97% yield) of crystalline N-methyl-β-p-tolylsulfonyl-α-styrylamine (M.P. 107–108° C.).

*Analysis.*—Calcd. for C$_{16}$H$_{17}$SO$_2$N: C, 66.88; H, 5.96. Found: C, 67.16; H, 6.24.

The structure of the product was further confirmed by its infrared spectrum and ultraviolet spectrum:

$$\lambda_{max.}^{EtOH} = 275$$

ε=13,700.

Irradiation of liquid N-methyl-N-α-styryl-p-toluenesulfonamide with ultraviolet light of high intensity for 6 hours caused rearrangement to N-methyl-β-p-tolylsulfonyl-α-styrylamine in a considerably lower yield.

The N-methyl-N-α-styryl-p-toluenesulfonamide was prepared as follows: A solution of 57 grams of p-toluenesulfonyl chloride in 150 ml. of pyridine was added slowly to a solution of 15 grams of α-N-methylaminophenylethanol in 125 ml. of pyridine, while the temperature was maintained at 40–45° C. The mixture was poured into a mixture of ice and hydrochloric acid and extracted with benzene. The crystalline N-methyl-N-p-tolylsulfonyl-2-amino-2-phenethyl-p-toluenesulfonate (22 grams, M.P. 103–104° C.) obtained on evaporating the dried benzene extract was refluxed for 2.5 hours with a solution of 6 grams of potassium hydroxide in 75 ml. of 95% alcohol. The cooled reaction mixture was slurried with 125 ml. of water and filtered to give 10.2 grams of crystalline N-methyl-N-α-styryl-p-toluenesulfonamide (M.P. 82–83° C.).

*Analysis.*—Calcd. for C$_{16}$H$_{17}$SO$_2$N: C, 66.88; H, 5.96. Found: C, 66.95; H, 6.25.

The structure of the compound was further confirmed by its ultraviolet spectrum $$(\lambda_{max.}^{EtOH} = 235$$

ε=18,300) and its infrared spectrum.

As shown in the above-mentioned copending application, the new aminovinylsulfones of this invention are useful as inhibitors for vinyl polymerization, and are especially effective in inhibiting the polymerization of vinyl acetate. They are also useful for crosslinking polyvinyl alcohol and other hydroxylated polymers; one merely heats a mixture of the polymer and the sulfone with water and a little mineral acid to obtain crosslinked polymer, probably by acetal formation between the polymer and the sulfonylacetaldehyde formed in situ.

Since obvious modifications in the invention will occur to those skilled in the chemical arts, we propose to be bound solely by the appended claims.

The embodiments of the invention in which an exclusive property or privilege is claimed are defined as follows:

1. The process of synthesizing a N-hydrocarbo-2-hydrocarbosulfonylvinylamine of the formula

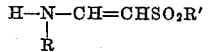

wherein R and R' are hydrocarbon radicals in which any unsaturation is aromatic and which possess not more than 12 carbon atoms each, which comprises subjecting a mixture of (1) a sulfonamide of the formula

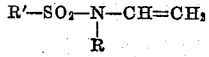

wherein R and R' are as defined above, and (2) about 1–15% by weight, based on the weight of the sulfonamide, of an azo compound having the acyclic azo, —N=N—, group bonded from each nitrogen atom to different carbon atoms non-aromatic in character, at least one of which is tertiary, and one of the carbons bonded to the tertiary carbon atom having its three remaining valences satisfied by at least one element of the group consisting of oxygen and nitrogen, to a temperature of between about 125° C. and —20° C., with the proviso that the mixture is also subjected to light within the wave-length range of about 3000–4500 Angstrom units at temperatures below about 35° C.

2. The invention of claim 1 accomplished in the liquid phase.

3. The invention of claim 1 accomplished in the presence of an inert solvent.

4. The invention of claim 2 in which the azo compound is decomposed by heat.

5. The invention of claim 1 in which the reaction is effected at a temperature of about 35–125° C.

6. The invention of claim 1 in which the azo compound is decomposed by light.

7. The method of synthesizing N-methyl-2-phenylsulfonylvinylamine which comprises subjecting a mixture of N-methyl-N-vinylbenzenesulfonamide and about 1–15% by weight, based on the weight of the sulfonamide, of an azo compound having the acyclic azo, —N=N—, group bonded from each nitrogen atom to different carbon atoms nonaromatic in character, at least one of which is tertiary, and one of the carbons bonded to the tertiary carbon atom having its three remaining valences satisfied by at least one element of the group consisting of oxygen and nitrogen, to a temperature of between about 125° C. and —20° C., with the proviso that the mixture is also subjected to light within the wave-length range of about 3000–4500 Angstrom units at temperatures below about 35° C.

8. The method of claim 7 wherein the azo compound is α,α'-azodiisobutyronitrile.

9. The method of synthesizing N-methyl-2-p-tolylsulfonylvinylamine which comprises subjecting a mixture of N-methyl-N-vinyl-p-toluenesulfonamide and about 1–15% by weight, based on the weight of the sulfonamide, of an azo compound having the acyclic azo, —N=N—, group bonded from each nitrogen atom to different carbon atoms nonaromatic in character, at least one of which is tertiary, and one of the carbons bonded to the tertiary carbon atom having its three remaining valences satisfied by at least one element of the group consisting of oxygen and nitrogen, to a temperature of between about 125° C. and —20° C., with the proviso that the mixture is also subjected to light within the wave-length range of about 3000–4500 Angstrom units at temperatures below about 35° C.

10. The method of claim 9 wherein the azo compound is a α,α'-azodiisobutyronitrile.

11. The method of synthesizing N-n-butyl-2-p-tolylsulfonylvinylamine which comprises subjecting a mixture of N-n-butyl-N-vinyl-p-toluenesulfonamide and about 1–15% by weight, based on the weight of the sulfonamide, of an azo compound having the acyclic azo, —N=N—, group bonded from each nitrogen atom to different carbon atoms nonaromatic in character, at least one of which is tertiary, and one of the carbons bonded to the tertiary carbon atom having its three remaining valences satisfied by at least one element of the group consisting of oxygen and nitrogen, to a temperature of between about 125° C. and —20° C., with the proviso that the mixture is also subjected to light within the wave-length range of about 3000–4500 Angstrom units at temperatures below about 35° C.

12. The method of claim 11 wherein the azo compound is α,α'-azodiisobutyronitrile.

13. The method of synthesizing N-methyl-2-β-naphthylsulfonylvinylamine which comprises subjecting a mixture of N-methyl-N-vinyl-β-naphthalenesulfonamide and about 1–15% by weight, based on the weight of the sulfonamide, of an azo compound having the acyclic azo, —N=N—, group bonded from each nitrogen atom to different carbon atoms nonaromatic in character, at least one of which is tertiary, and one of the carbons bonded to the tertiary carbon atom having its three remaining valences satisfied by at least one element of the group consisting of oxygen and nitrogen, to a temperature of between about 125° C. and —20° C., with the proviso that the mixture is also subjected to light within the wave-length range of about 3000–4500 Angstrom units at temperatures below about 35° C.

14. The method of claim 13 wherein the azo compound is α,α'-azodiisobutyronitrile.

15. The method of synthesizing N-methyl-β-p-tolylsulfonyl-α-styrylamine which comprises subjecting a mixture of N-methyl-N-α-styryl-p-toluenesulfonamide and about 1–15% by weight, based on the weight of the sulfonamide, of an azo compound having the acyclic azo, —N=N—, group bonded from each nitrogen atom to different carbon atoms nonaromatic in character, at least one of which is tertiary, and one of the carbons bonded to the tertiary carbon atom having its three remaining valences satisfied by at least one element of the group consisting of oxygen and nitrogen, to a temperature of between about 125° C. and —20° C., with the proviso that the mixture is also subjected to light within the wave-length range of about 3000–4500 Angstrom units at temperatures below about 35° C.

16. The method of claim 15 wherein the azo compound is α,α'-azodiisobutyronitrile.

No references cited.

UNITED STATES PATENT OFFICE
CERTIFICATION OF CORRECTION

Patent No. 2,959,617 November 8, 1960

Blaine Chase McKusick et al.

It is hereby certified that error appears in the above numbered patent requiring correction and that the said Letters Patent should read as corrected below.

Column 3, line 5, for "N-methyl-N-vinylbenbenesulfonamide" read -- N-methyl-N-vinylbenzenesulfonamide --; column 6, line 32, for the claim reference numeral "2" read -- 1 --.

Signed and sealed this 25th day of July 1961.

(SEAL)
Attest:

ERNEST W. SWIDER
Attesting Officer

DAVID L. LADD
Commissioner of Patents